United States Patent [19]
van der Lely et al.

[11] 3,791,322
[45] Feb. 12, 1974

[54] DEVICES FOR INTRODUCING PLANT GROWTH STIMULANTS, PARTICULARLY FERTILIZERS

[76] Inventors: Ary van der Lely, 10 Weverskade, Maasland; Cornelis Johannes Gerardus Bom, 36 Esdoornlaan, Rozenburg, both of Netherlands

[22] Filed: Feb. 8, 1972

[21] Appl. No.: 224,592

Related U.S. Application Data
[62] Division of Ser. No. 134, Jan. 2, 1970, abandoned.

[52] U.S. Cl. .................................. 111/7, 172/112
[51] Int. Cl. ............................................. A01c 23/02
[58] Field of Search ..... 172/112, 117; 111/1, 67, 85

[56] References Cited
UNITED STATES PATENTS

| | | | |
|---|---|---|---|
| 3,347,188 | 10/1967 | Richey | 111/10 |
| 3,110,275 | 11/1963 | Bonney | 111/1 X |
| 3,170,421 | 2/1965 | Norris et al. | 111/7 X |
| 3,437,061 | 4/1969 | Wells | 111/1 |
| 2,473,770 | 6/1949 | Seaman | 172/117 X |
| 3,194,193 | 7/1965 | Walters | 172/112 X |
| 3,224,347 | 12/1965 | Seaman | 172/112 X |

FOREIGN PATENTS OR APPLICATIONS

| | | | |
|---|---|---|---|
| 1,094,681 | 12/1967 | Great Britain | 172/112 |

Primary Examiner—Stephen C. Pellegrino
Attorney, Agent, or Firm—Mason, Mason & Albright

[57] ABSTRACT

A device for introducing substances, such as fertilizers in the soil includes a wheeled frame supporting a dispenser with a soil penetrating tube and a soil working member that subsequently agitates the soil to prevent the substances from escaping the soil.

10 Claims, 6 Drawing Figures

3,791,322

DEVICES FOR INTRODUCING PLANT GROWTH STIMULANTS, PARTICULARLY FERTILIZERS

This is a divisional of application Ser. No. 134 filed Jan. 2, 1970, now abandoned.

These known devices have, as is known, the disadvantage that the substance introduced into the soil may partly escape so that undesirable losses are involved. By means of the construction according to the invention these unwanted losses are completely avoided or minimized.

According to the invention this is achieved by providing along with the members introducing the substance into the soil a mechanically driven, rotatable soil cultivating member. In this manner the substance can be introduced into the soil so that escape of the substance, evaporation or the like are not at all or substantially not possible.

For a better understanding of the invention and to show how the same may be carried into effect, reference is made by way of example to the accompanying drawings.

Figure 1:
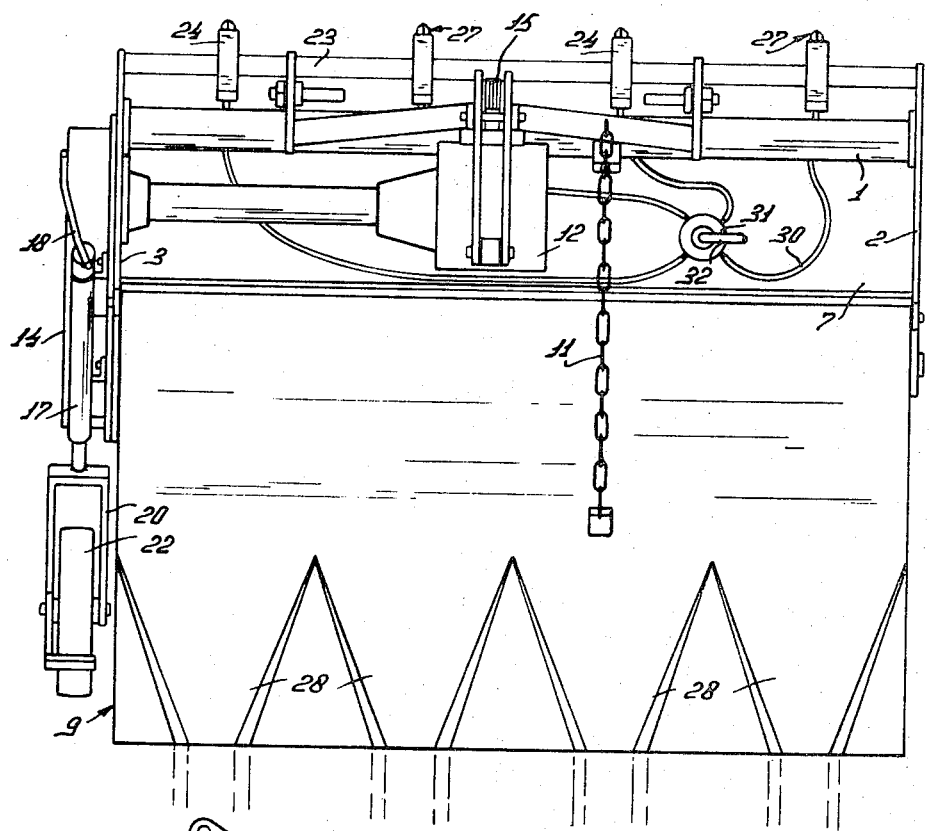
FIG. 1 is a plan view of a device in accordance with the invention.
Figure 2:
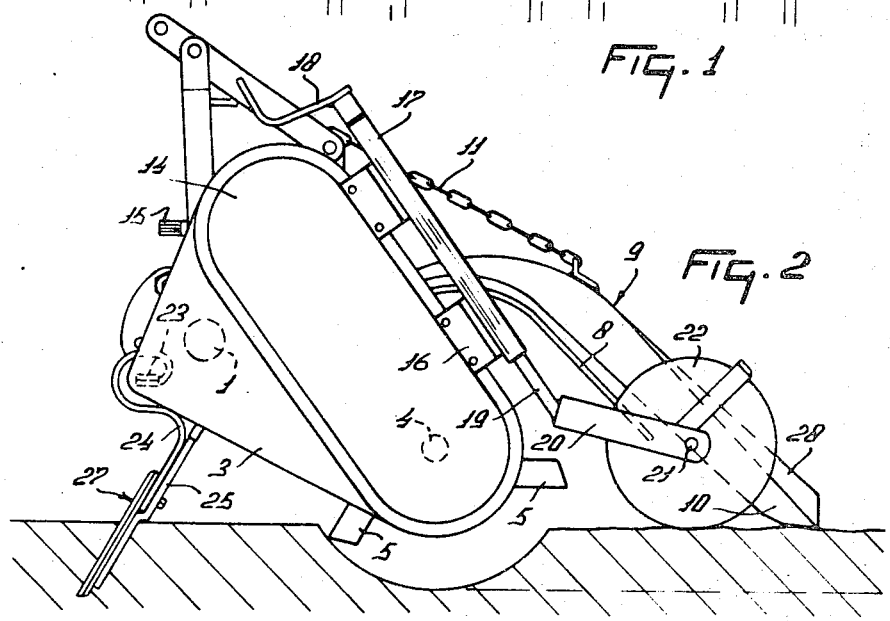
FIG. 2 is a side elevation of the device of FIG. 1.

The device shown in FIGS. 1 and 2 comprises a frame having a frame beam 1 extending transversely of the intended direction of travel and having fastened to its ends vertical, rearwardly inclined plates 2 and 3. Near the lower ends of the plates 2 and 3 a shaft 4, extending transversely of the intended direction of travel and parallel to the frame beam 1 is arranged by means of bearings between the plates. The shaft 4 is provided at regular intervals with working members 5. Between the plates 2 and 3, approximately near their centres, an angle-section iron 6 extends parallel to the frame beam. The angle-section iron has arranged on it a rotary shaft 4 between the plates 2 and 3 and with a hood 7, surrounding at least partly the working members 5 arranged on said shaft. The hood 7, which extends from the angle-section iron to the front in downward direction, is concentrical to the shaft 4 and surrounds said shaft over an angle of less than 90°. On the rear side equidistant spring rods 8 are provided on the angle-section iron so as to be at least substantially concentrical to the shaft 4, which rods 8 form a grating. Between the plates 2 and 3 a screening hood 9 is pivotally arranged above the rods 8. It will be apparent from FIG. 2 that the hood 9 extends so that in operation the lower end bears by a portion 10 on the worked strip of soil. By means of a chain 11 the hood 9 can be set in a plurality of positions in a direction of height and be fixed therein. The frame beam 1 is provided near its centre with a gear box 12. The gear box 12 accommodates the end of a shaft extending parallel to the frame beam 1 and coupled with the rotary shaft 4 via a transmission accommodated in a casing 14. By means of a shaft 15, extending in the direction of travel and located in the gear box a driving link can be established through an auxiliary shaft with the power take-off shaft of a tractor or the like propelling the device. The frame beam 1 is furthermore provided with means for attaching the device to the three-point lifting device of the tractor. On the rear side of the casing 14 a tubular guide 17 is arranged by means of two spaced supports 16, in which guide 17 a screw spindle 18 can co-operate with a screw-threaded end of a pipe 19 projecting from the lower end of the tubular guide. The pipe 19 is provided at its end remote from the tubular guide 17 with a fork-shaped part 20. Between the prongs of the fork-shaped part 20, near the end, an axle 21 is arranged, about which a ground wheel 22 is adapted to rotate. Between the plates 2 and 3, in front of the frame beam a support 23 is arranged parallel to said beam. At regular intervals the support 23 is provided with four cultivator tines 24, which are provided on the rear side with an injection tube 25, which together with a tine 24 forms a feeding member 27, which communicates through a flexible hose 30 with a distributor 31, which is connected by a flexible hose 38 with a tank on the tractor containing a fertilizer such as liquid ammonia. The screening hood 9 is provided near the rear side with guides 28 forced by embossed parts and arranged so that a guide member 28 is found behind each feeding member 27. Each guide member 28 extends in funnel fashion from front to rear.

The device specified above operates as follows:

In operation the working members 5 of the device, attached to a tractor, can be driven by the power take-off shaft via the gear box 12 and the transmission in the casing 14 so that they move across the soil in the direction of the arrow B. The soil thrown up by the working members passes along the hood 7 onto the rods 8, whilst lumps and the like are guided into the furrow made by the working members, whereas the loose soil passes across the grating formed by the rods and covers the material introduced into the furrow. The feeding members 27 at the front of the device for introducing the plant growth stimulants, particularly fertilizers, such as liquid ammonia into the soil, make furrows during the movement, in which the ammonia is received as a gas-liquid mixture from the injection tubes 25. The soil thrown by the working members 5 and passing in between the rods 8 is guided along the inner side of the screening hood 9 and the funnel-shaped guide member 28 provided behind each feeding member so that this soil is deposited in the form of a small dam on the furrow made by a feeding member 27, so that the furrow is rapidly and thoroughly closed, it being avoided that the substance introduced into the furrow should disappear by evaporation.

Figure 3:
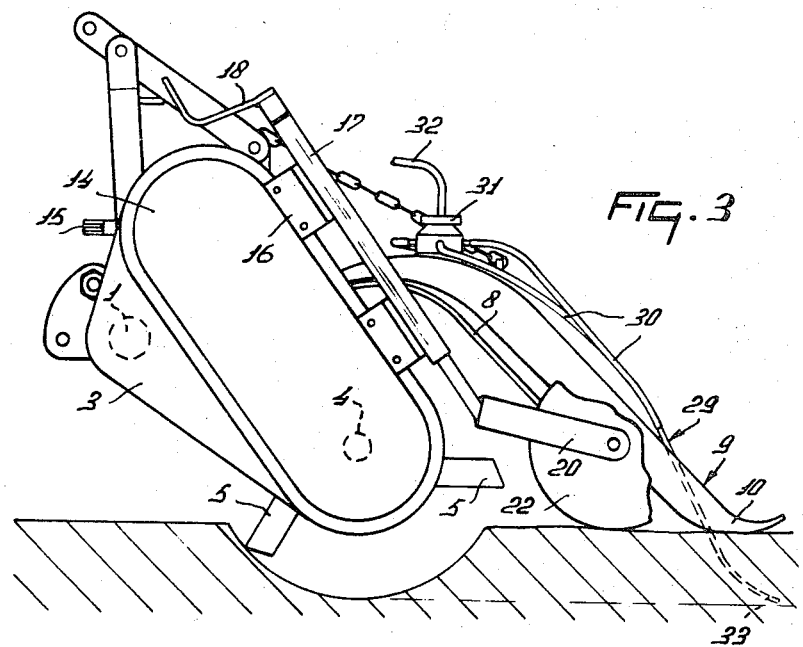
FIG. 3 is a side elevation of a second embodiment of a device in accordance with the invention.

In the embodiment shown in FIG. 3 equidistant injection tubes 29 are provided for the supply of the plant growth stimulants, in this example also ammonia, delivered from a tank (not shown) partly in the form of a gas and partly in the form of a liquid. The tubes 29 are arranged near the rear side of the screening hood 9. The tubes 29 form feeding members, which communicate each by a hose 30 with a distributor 31. The distributor 31, arranged on the screening hood 9, communicates through a duct 32 with a tank (not shown). Each injection tube 29 is bent over to the rear at its lower end by a portion 33, which extends substantially in a horizontal direction, so that the introduction is improved. The ends of the injection tubes 29 projecting above the hood 9, which are passed through it and are fastened thereto, are connected with the hose 30. In the construction shown in FIG. 3 the injection tubes 29 introduce the substance directly into the loose layer of the soil passed through the rods 8, whilst the rear end of the hood 9 smoothes the ground to a closed surface so that losses due to evaporation and the like do not occur, and a uniform distribution can be ensured.

Figure 4:
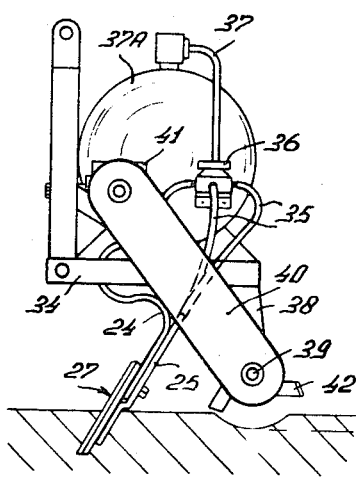
FIG. 4 is a side elevation of a third embodiment of a device in accordance with the invention.
Figure 5:
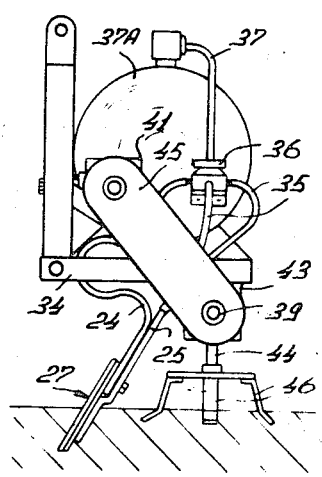
FIG. 5 is a side elevation of a fourth embodiment of a device in accordance with the invention.
Figure 3A:
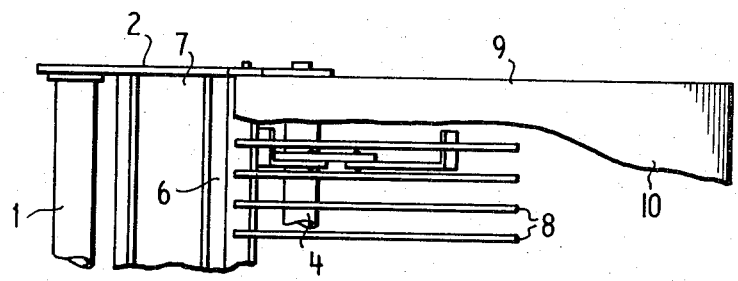
FIG. 3A is a plan view in section of the hood and grating construction.

In the embodiment shown in FIG. 4 a frame 34, which can be coupled with a tractor, is provided with four equidistant feeding members of the same structure as the feeding members 27 of the first embodiment. Each of the injection tubes 25 communicates through a flexible hose 35 with a distributor 36, which communicates through a duct 37 with a container 37A which may contain liquid ammonia. Behind the feeding members 27 a horizontal shaft, extending transversely of the direction of movement is arranged by means of supports 38, which shaft 39 can be driven via a transmission in a casing 40 and a gear box 41 by the power take-off shaft of the tractor. Behind each feeding member 27 the shaft 39 has fastened to it a group of working members 42, which close in operation the furrow made by the feeding members, so that the substance introduced into the furrows is prevented from escaping by evaporation. In the construction of the embodiment shown in FIG. 5 vertical shafts 44 are arranged behind each feeding member 27, said shafts being in driving connection with the shaft 39 via gear boxes 43. The shaft 39 can be driven via the gear box 41 and a transmission in a casing 45 from the power take-off shaft of a tractor. Each shaft 44 holds a number of working members 46 forming one group. Also in this construction each furrow is closed effectively by means of the mechanically driven working members 46.

We claim:

1. An agricultural attachment device for introducing plant stimulants into soil comprising a movable frame, and a stimulant dispenser supported on said frame, said dispenser comprising a plurality of soil penetrating injecting tubes that extend below said frame into the ground to dispense said stimulants, rotatable cultivating tool means being mounted on said frame to work the soil in front of said injecting tubes and driving means for operating said cultivating tool means, said cultivating tool means comprising a plurality of soil working members rotatable about a substantially horizontal shaft and said shaft extending transversely of the direction of travel of said device, a curved screening hood on said attachment positioned above said soil working members, the front of said hood being connected to said frame and the rear portion of said hood extending rearwardly and downwardly to contact the ground said injecting tubes being passed through the rear portion of said screening hood and said tubes being secured to said hood and extending below same into the loose soil worked by said tool means.

2. A device as claimed in claim 1, wherein the ends of said injecting tubes are bent up to the rear to terminate in a substantially horizontal direction below the rear portion of said hood which contacts the ground.

3. A device as claimed in claim 1, wherein said soil working members are driven to move through the ground in a direction counter to the movement of said device whereby soil is thrown upwardly above said soil working members.

4. A device as claimed in claim 1, wherein the injecting tubes are arranged side by side in a transverse row.

5. A device as claimed in claim 1, wherein a grating is supported on said frame above said working members and below said screening hood to separate coarse parts from soil thrown upwardly and rearwardly by said soil working members.

6. A device as claimed in claim 1, wherein said screening hood extends substantially across the entire width of the device.

7. A device as claimed in claim 1, wherein said dispenser is secured to said hood.

8. A device as claimed in claim 7, wherein the front of said screening hood is pivotally connected to said frame and lifting means is secured to the hood to the rear of said front, whereby the height of the injecting tubes can be regulated by pivoting said hood upwardly about the pivot connection.

9. A device as claimed in claim 1, wherein a ground wheel is mounted on said frame to the rear of said tool means and said ground wheel supports said device through an adjustable connection whereby the working depth of said tool means can be controlled by adjusting said connection.

10. A device as claimed in claim 1, wherein said frame has coupling means for connecting said device to a three point lift of a tractor.

* * * * *